United States Patent [19]

Harrington, IV et al.

[11] Patent Number: 5,269,942
[45] Date of Patent: Dec. 14, 1993

[54] QUATERNIZED POLYVINYLAMINES FOR DEINKING LOOP CLARIFICATION

[75] Inventors: John C. Harrington, IV, Jacksonville, Fla.; Jen-Chi Chen, Morrisville; Fu Chen, Newtown, both of Pa.

[73] Assignee: Betz Laboratories, Trevose, Pa.

[21] Appl. No.: 424

[22] Filed: Jan. 4, 1993

[51] Int. Cl.⁵ ............................................. C02F 1/56
[52] U.S. Cl. ................................. 210/727; 162/5; 210/734; 210/735; 210/736; 210/928
[58] Field of Search ............... 162/5; 210/725, 727, 210/728, 734, 735, 736, 928

[56] References Cited

U.S. PATENT DOCUMENTS

| | | | |
|---|---|---|---|
| 3,624,019 | 11/1971 | Anderson et al. | 210/734 |
| 3,715,336 | 2/1973 | Nowak et al. | 210/734 |
| 4,217,214 | 8/1980 | Dubin | 210/52 |
| 4,808,683 | 2/1989 | Itagaki et al. | 526/307.2 |
| 4,824,913 | 4/1989 | Murao et al. | 525/344 |
| 4,835,206 | 5/1989 | Farrar et al. | 210/736 |
| 4,957,977 | 9/1990 | Itagaki et al. | 525/328.4 |
| 5,013,456 | 5/1991 | St. John et al. | 210/735 |

OTHER PUBLICATIONS

Betz Handbook of Industrial Water Conditioning; 9th ed., 1991; pp. 23-30.
Pulp & Paper Chemistry & Chemical Technology; 3d ed., vol. III, 1981; pp. 1593-1607.

*Primary Examiner*—Peter Hruskoci

[57] ABSTRACT

The use of quaternized polyvinylamine for use in clarification of water in a deinking loop of a paper, such as newspaper, recycling operation.

5 Claims, 3 Drawing Sheets

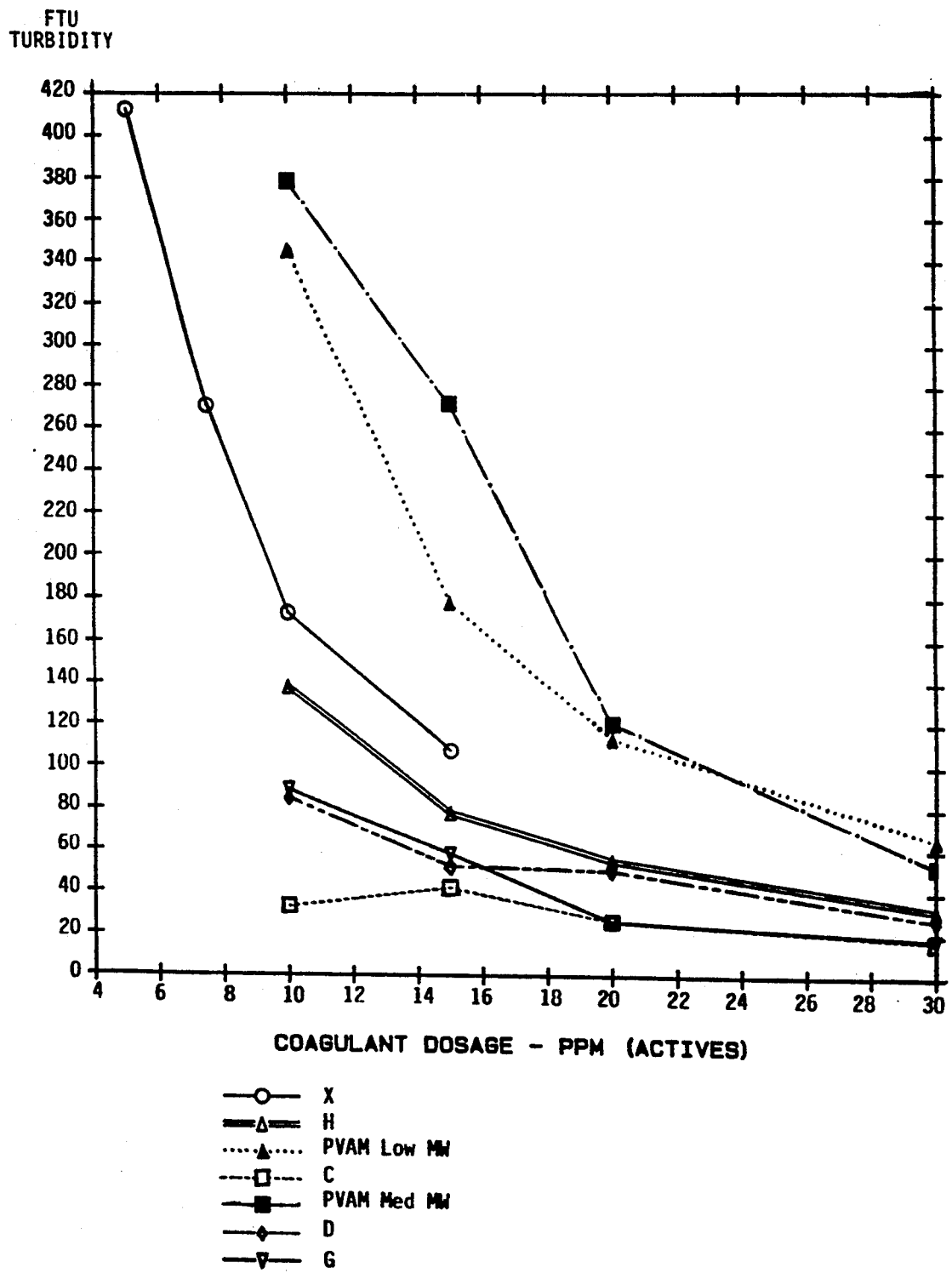

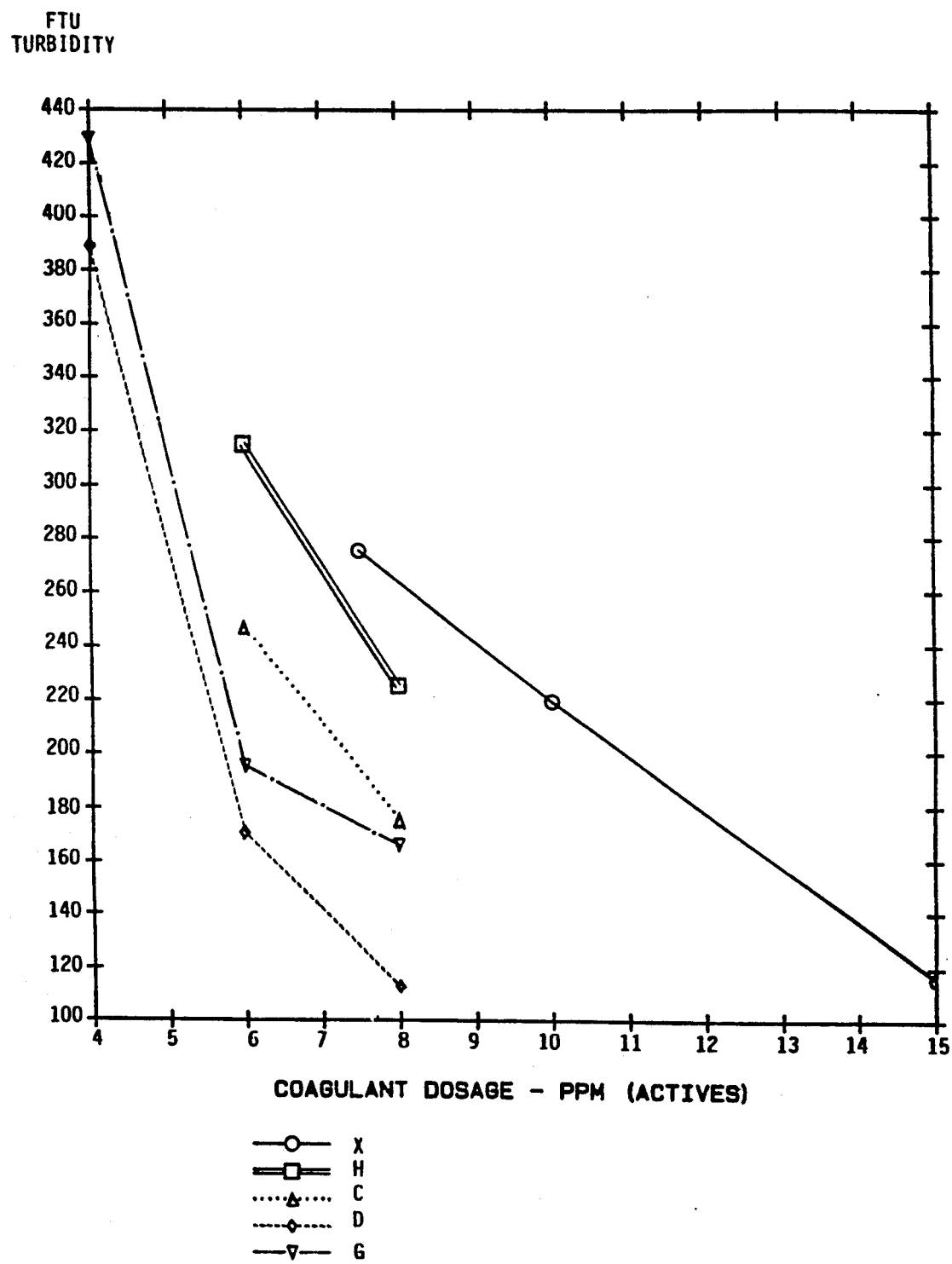

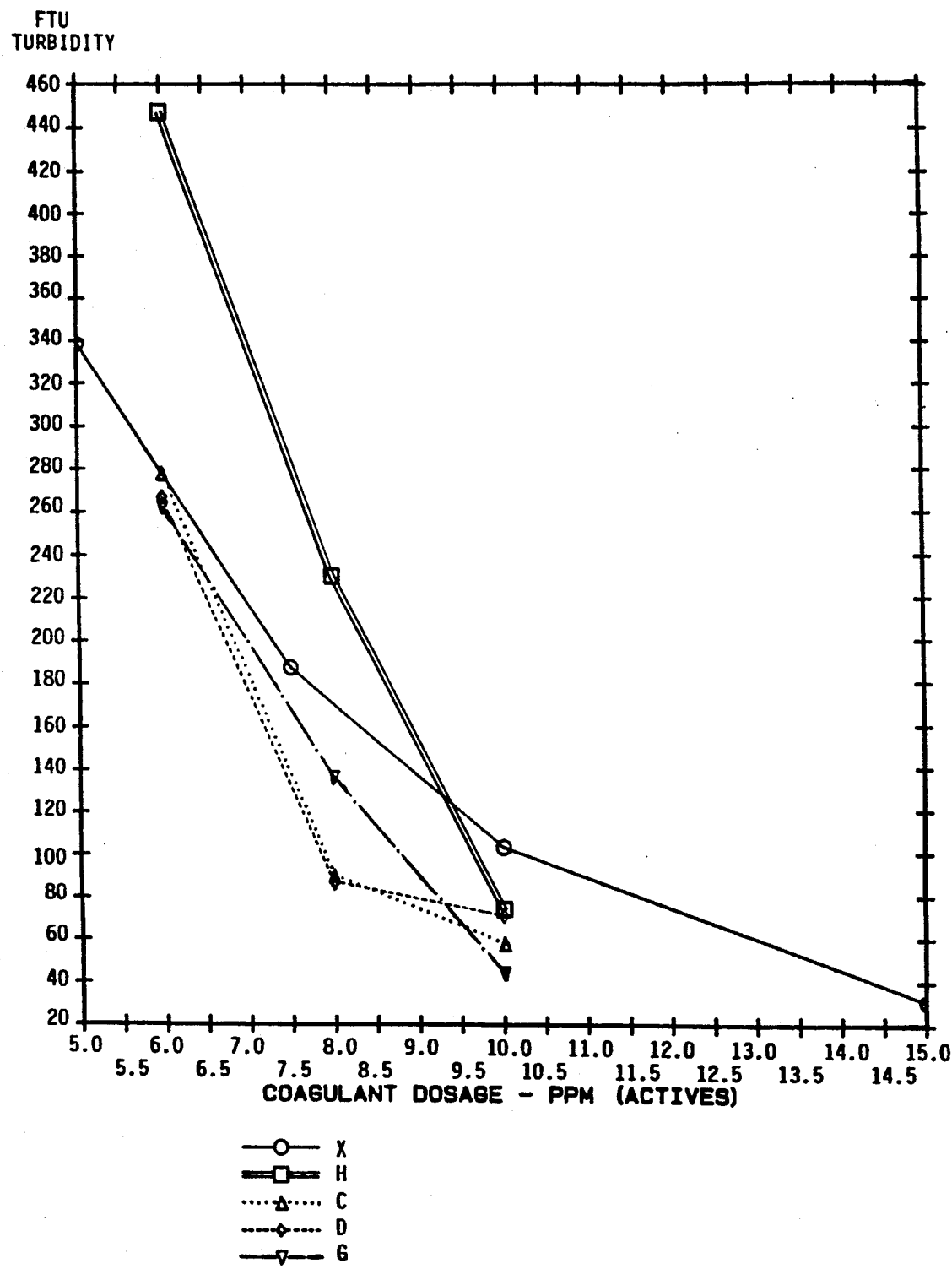

5,269,942

QUATERNIZED POLYVINYLAMINES FOR DEINKING LOOP CLARIFICATION

FIELD OF THE INVENTION

The present invention relates to the use of quaternized polyvinylamines for water clarification. More particularly, the present invention relates to the use of quaternized polyvinylamines for the clarification of water in the deinking loop of a paper, such as newspaper, recycling operation.

BACKGROUND OF THE INVENTION

The use of recycled fibers is becoming an important aspect of papermaking for economic and environmental considerations. The preliminary manufacturing steps in the use of recycled fibers for papermaking consists of repulping the paper sources, then removing the printing inks from the fibers. A typical deinking process utilizes a combination of chemical and mechanical techniques in several stages. Large amounts of water are used in the washing or flotation stages, wherein chemically treated ink particles and other contaminants are physically removed from the fibrous slurry. The wastewater, or effluent, from these stages is typically recycled back into the mill for reuse in the deinking process. As the recycled effluent contains dispersed inks, fiber fines and inorganic fillers, these contaminants must be removed to provide a clean water source for the deinking process and to prevent the dispersed inks from being reintroduced into the fibers. The effluent may also be discharged from the mill; thus, suspended solids must be removed from the wastewater to meet environmental regulations.

Clarification chemicals are typically utilized in conjunction with mechanical clarifiers for the removal of solids from the effluent. Clarification generally refers to the removal of nonsettleable material by coagulation, flocculation, and sedimentation. See the Betz Handbook of Industrial Water Conditioning 9th Edition, 1991, Betz Laboratories, Inc., Trevose, Pa., pages 23 through 30.

Coagulation is the process of destabilization by charge neutralization. Once neutralized, particles no longer repel each other and can be brought together. Coagulation is necessary for removal of colloidal sized suspended matter. Flocculation is the process of bringing together of the destabilized, "coagulated" particles to-form a larger agglomeration or floc. Sedimentation, or settling, refers to the physical removal of particles from suspension that occurs once the particles have been coagulated and flocculated. Sedimentation alone, without prior coagulation results in the removal of only relatively coarse suspended solids.

The clarification chemicals utilized in conjunction with mechanical clarifiers coagulate and/or flocculate the suspended solids into larger particles, which can then be removed from the effluent by gravitational settling or flotation. Depending upon the characteristics of the individual effluent, differing chemical types and programs may be utilized.

Clarification studies performed on newsprint deinking effluent indicates that these systems have a large anionic charge demand, requiring the use of a dual polymer system for effective clarification. A dual polymer system operates upon a Patch Model Method as described in Pulp and Paper, 3rd Edition, Volume 3, James P. Casey, at pages 1597 to 1599. The patch model system typically comprises a low molecular weight cationic coagulant in combination with a high molecular weight anionic flocculant.

The use of vinylamine copolymers for flocculation in water treatment is known. U.S. Pat. No. 4,217,214 discloses the use of high molecular weight polyvinylamine hydrochloride as a flocculating agent in treating water systems. Polyvinylamine hydrochloride is an ethenamine hydrochloride homopolymer, CAS Registry No. 29792-49-2.

U.S. Pat. No. 4,808,683 discloses the use of a mixture of a vinylamine copolymer of the formula disclosed therein as a flocculating agent, drainage aid, and paper strength increasing agent.

U.S. Pat. No. 4,957,977 discloses the use of a mixture of vinylamine copolymers of the formula disclosed therein as a flocculating agent and a paper strength increasing agent.

SUMMARY OF THE INVENTION

The present invention is directed to a method of clarifying waste water in a deinking process in which quaternized polyvinylamines are employed as clarification agents. Quaternary polyvinylamines are obtained from the reaction of a polyvinylamine with a quaternizing agent such as methyl(ethyl) chloride, dimethyl(ethyl) sulfate or benzyl chloride.

The quaternized polyvinylamines of the present invention were found to provide improved clarification of deinking loop waters. The quaternized polyvinylamines are effective in amounts which vary depending upon the particular system being treated. The treatment levels can vary from about 0.1 to about 100 parts per million parts of water depending upon factors such as: pH, temperature, water quantity and extent of contamination of the water.

BRIEF DESCRIPTION OF THE DRAWINGS

FIG. 1 is a graph of Turbidity vs. dosage for a variety of coagulants in a dual polymer system at constant 1 ppm anionic flocculant for Southeastern papermill substrate.

FIG. 2 is a graph of Turbidity vs. dosage for a variety of coagulants in a dual polymer system at constant 1 ppm anionic flocculant for Southeastern papermill substrate.

FIG. 3 is a graph of Turbidity vs. dosage for a variety of coagulants in a dual polymer system at constant 1 ppm anionic flocculant for Northwestern papermill substrate.

DESCRIPTION OF THE PREFERRED EMBODIMENT

The present invention relates to a method of clarifying wastewater in a deinking process. Specifically, the method comprises treating water to be clarified with a sufficient amount of a quaternized polyvinyl amine to reduce turbidity and color.

The quaternized polyvinylamine employed in the present invention is preferably prepared from a polyvinylamine hydrochloride. Polyvinylamine hydrochloride can be prepared by polymerizing N-vinylformamide or N-vinyl acetamide which is then hydrolyzed and converted to the desired amine salts by contacting with an appropriate mineral acid.

These amine salts of the general formula

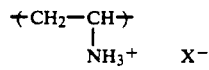

where $X^-$ is a water soluble anion such as Cl, are thereafter quaternized to form the quaternized polyvinylamines employed in the present invention of the general formula.

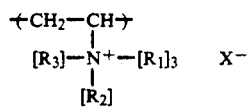

wherein $R_1$ $R_2$ $R_3$ can be, independently, methyl, ethyl or benzyl and $X^-$ is a water soluble anion such as: Cl, Br, I, or $CH_3SO_4$. The molecular weight of the polyvinylamine can range from about 1,000 to about 1 million, and preferably from about 10,000 to about 500,000.

Regardless of the method of formation of a polyvinylamine hydrochloride, the critical reaction for forming the material employed in the present invention is the quaternization reaction. Quaternized polyvinylamine is formed by reacting the polyvinyl amine or polyvinylamine hydrochloride with a quaternizing agent such as methyl chloride, dimethyl sulfate or benzyl chloride with aqueous sodium hydroxide as shown in Formula I.

FORMULA I

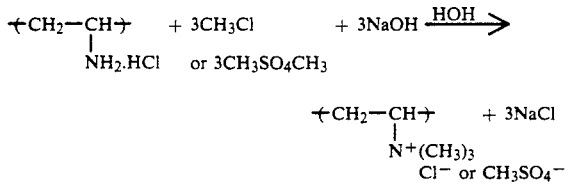

The resulting polymer solution is preferably concentrated and dialyzed to remove the salts. The extent or degree of quaternization can be substantiated by C-13 and N-15 NMR spectroscopy and conventional colloid titration. The titration measures the degree of quaternization (cationicity) as expressed in milliequivalents per gram of material, (meq/g) using potassium polyvinyl sulfate solution as titrant and toluidine blue as indicator.

While specific methods of preparing quaternary polyvinylamines for use in the present invention have been described they are not intended to be limiting. These described methods are only exemplary methods of preparing the quaternized polyvinylamine used in the method of the present invention. Alternate means of preparing quaternary polyvinylamine may be employed to form the material used in the method of the present invention.

The following experimental procedures were employed to prepare the materials tested in the Examples.

Synthesis of poly N-vinylformamide: A monomer solution containing 40.0 grams of N-vinylformamide (Air Products) and 220.5 grams of deionized water was charged to a reaction flask. The solution was slowly heated to 60° C. under a nitrogen atmosphere. An initiator solution containing 1.2 grams of V-50 (2,2' azobis-(2-amidinopropane)dihydrochloride available from Wako Chemicals) was added to the solution. The solution was held at 60° C. for 7 hours and cooled. The resulting polymer was verified as poly-N-vinylformamide by C-13 NMR.

Preparation of Polyvinylamine (Polymer A): A polymer solution of 87.7 grams of poly N-vinylformamide and 26.4 grams of concentrated hydrochloric acid was charged into a reaction flask. The solution was heated to 100° C. and held for six hours. The resulting polymer solution was transferred to a cellulose tubing (MWCO-1000) and was dialyzed against fresh deionized water. The resulting polymer solution had a Brookfield viscosity of 9.1 cps at 2.0% solids.

Quaternization of Polyvinylamine (Polymer B): A polymer solution containing 52.1 grams of the polyvinylamine solution (Polymer A, 4.8% solids), 13.8 grams of isopropanol, 14.5 grams of 50% sodium hydroxide and 16.7 grams of deionized water was charged into a 450 ml pressure reactor. The reaction vessel was cooled by a dry-ice/isopropanol bath and was then charged with 12.5 grams of methyl chloride. The reactor was heated to 80° C. and held for 5 hours. The resulting polymer solution was concentrated and dialyzed against fresh deionized water. The structure of the polymer was verified by C-13 NMR. The polymer solution had a Brookfield viscosity of 5.5 cps at 2.0% solids (25° C.).

Quaternization of Polyvinylamine (Polymer C): a polymer solution containing 7.5g of polyvinylamine hydrochloride (Air Products, medium MW) was reacted with 17.8 grams of methyl chloride in the same procedure described above. The resulting quaternized polymer had a Brookfield Viscosity of 9.3 cps at 2.0% solids (25° C.).

Quaternization of Polyvinylamine (Polymer D): a polyvinylamine solution (Air Products, low MW) was reacted with methyl chloride at 65° C. in the same procedure described above. The resulting quaternized polymer had a Brookfield viscosity of 4.0 cps at 2.0% solids (25° C.).

Quaternization of Polyvinylamine (Polymer E): The polymer was prepared from N-vinylformamide and quaternized with methyl chloride at 65° C. by the procedure described above. The resulting polymer had a Brookfield viscosity of 13.5 cps at 2.0% solids (25° C.).

Synthesis of Polyvinylamine (Polymer F): 370 grams of poly N-vinylformamide solution (Polymer E) and 111 grams of concentrated hydrochloric acid were charged to a reaction flask and heated to 100° C. under a nitrogen atmosphere. The solution was held at 100° C. for 24 hours. The resulting polymer was isolated by precipitation in an isopropanol/water mixture. The resulting solid was dried in a vacuum oven at 50° C. overnight. The polymer had a Brookfield viscosity of 10.4 cps at 2.0% solids in water (25° C.).

Quaternization of Polyvinylamine (Polymer G): The polymer F solution was quaternized with methyl chloride at 65° C. by the procedure described above. The resultant polymer had a Brookfield viscosity of 13.5 cps at 2.0% solids (25° C.).

Quaternization of Polyvinylamine (Polymer H): a polymer solution containing 7.5 g of polyvinylamine hydrochloride (Air Products, low MW) was reacted with 17.5 grams of methyl chloride at 80° C. in the same procedure described above the resulting quaternized polymer had a Brookfield viscosity of 2.1 cps at 2.0% solids (25° C.).

Table 1 summarized the cationicity of the quaternized polyvinylamines tested in the following examples. Cationicity of the quaternized polyvinylamines tested in the following examples. Cationicity is an indication of the degree of quaternization of the material.

TABLE 1

| Polymer | Cationicity (meq/gram) |
|---------|------------------------|
| C | 7.2 |
| B | 8.0 |
| D | 7.4 |
| G | 7.5 |
| H | 5.6 |

The present invention will now be further described with reference to a number of specific examples which are intended to be illustrative and not as restricting the scope of the present invention.

Efficacy testing of quaternary polyvinylamine polymers as deinking water clarifiers in direct comparison to epichlorohydrin/-dimethyl amine cationic polymers was undertaken. The deinking water was clarified by the patch model method wherein low molecular weight cationic polymer is employed in combination with a high molecular weight anionic polymer.

EXAMPLE 1

The materials to be tested were added to substrates comprising deinking loop waters from a southeastern and a northwestern paper mill. The test substrates had the following properties; northwestern: turbidity 1200, suspended solids 0.11%, pH 8.7; southeastern: turbidity 3400, suspended solids 0.30%, pH 9.3.

In the tables, X is an epichlorohydrin/-dimethylamine/-multifunctional amine branched condensation polymer with an intrinsic viscosity of about 0.50 dl/gr. Y is a commercial anionic acrylamide copolymer with a 30 mole % charge and an intrinsic viscosity of 20–25 dl/gr. Z is a commercial anionic acrylamide copolymer with a 30 mole % change and an intrinsic viscosity of 14–22 dl/gr. Y and Z utilize different surfactant systems for polymerization and inversion.

The test procedure was chosen to simulate the operation of the deinking loop clarifier at the mill which supplied the test substrate. The test procedure comprised placing 250 milliliters of the test substrate at 25° C. into a 400 milliliter glass beaker and stirring at high speeds with a magnetic stirrer. The coagulant (cationic polymer) was introduced into the center of the vortex with a syringe. The mixture was allowed to mix for a period of time consistent with the source mills clarifier design (see Table 2). Typically, the coagulant was mixed for 10 to 60 seconds. The flocculant (anionic emulsion) was then added to the vortex. The mixture was further stirred for a period of time consistent with the source mills clarifier design (see Table 2) typically 10 to 45 seconds. Thereafter, the stirring speed was reduced for a period of time, typically 30 to 60 seconds. The flocculated mixture was allowed to settle and settling volume and time recorded. The supernatant was removed and the turbidity measured with a laboratory bench-top turbidmeter.

Table 2 summarizes the mixing periods for the two test substrates. Table 3 and 4 summarize the test results for a variety of coagulant/flocculant combinations (identified as polymer) at a variety of treatment dosages for the Southeastern Papermill substrate. The data from Tables 3 and 4 is illustrated in FIG. 1 and 2. Table 5 summarizes the test results for a variety of coagulant/-flocculant combinations (identified as polymer) at a variety of treatment dosages for the Northwestern Papermill substrate. The data from Table 5 is illustrated in FIG. 3.

TABLE 2

| Mixing Times | Southeast Papermill | Northwest Papermill |
|---|---|---|
| Coagulant Mix Time-Seconds | 15 | 60 |
| Flocculant Mix Time-Seconds | 15 | 15 |
| Low Speed Mix Time-Seconds | 30 | 45 |
| Settling Time-Minutes | 5 | 2 |

TABLE 3

Clarification Test
Southeast Papermill

| Treatment | Dosage(ppm) Actives/Solution | FTU Turbidity |
|---|---|---|
| X/Y | 5/1 | 412 |
|  | 7.5/1 | 270 |
|  | 10/1 | 173 |
|  | 15/1 | 107 |
| Polymer H/Y | 10/1 | 138 |
|  | 15/1 | 78 |
|  | 20/1 | 55 |
|  | 30/1 | 32 |
| PVAM low MW/Y | 10/1 | 345 |
|  | 15/1 | 178 |
|  | 20/1 | 113 |
|  | 30/1 | 65 |
| Polymer C/Y | 10/1 | 33 |
|  | 15/1 | 42 |
|  | 20/1 | 26 |
|  | 30/1 | 17 |
| PVAM Med. MW/Y | 10/1 | 378 |
|  | 15/1 | 271 |
|  | 20/1 | 120 |
|  | 30/1 | 52 |
| Polymer D/Y | 10/1 | 85 |
|  | 15/1 | 52 |
|  | 20/1 | 50 |
|  | 30/1 | 27 |
| Polymer G/Y | 10/1 | 89 |
|  | 15/1 | 58 |
|  | 20/1 | 26 |
|  | 30/1 | 18 |

TABLE 4

Clarification Test
(Southeastern Papermill)

| Treatment | Dosage(ppm) Actives/Solution | FTU Turbidity |
|---|---|---|
| Polymer X/Y | 7.5/1 | 275 |
|  | 10/1 | 219 |
|  | 15/1 | 116 |
| Polymer H/Y | 6/1 | 315 |
|  | 8/1 | 225 |
| Polymer C/Y | 6/1 | 247 |
|  | 8/1 | 176 |
|  | 4/1 | 389 |
| Polymer D/Y | 6/1 | 171 |
|  | 8/1 | 113 |
| Polymer G/Y | 4/1 | 429 |
|  | 6/1 | 195 |
|  | 8/1 | 166 |

TABLE 5

Clarification Test
(Northwest Papermill)

| Treatment | Dosage(ppm) Actives/Solution | FTU Turbidity |
|---|---|---|
| Polymer X/Z | 5/3 | 338 |
|  | 7.5/3 | 187 |
|  | 10/3 | 103 |
|  | 15/3 | 31 |
| Polymer H/Z | 6/3 | 447 |
|  | 8/3 | 230 |

TABLE 5-continued

| Clarification Test (Northwest Papermill) | | |
|---|---|---|
| | 10/3 | 74 |
| Polymer C/Z | 6/3 | 278 |
| | 8/3 | 90 |
| | 10/3 | 58 |
| Polymer D/Z | 6/3 | 267 |
| | 8/3 | 87 |
| | 10/3 | 71 |
| Polymer G/Z | 6/3 | 262 |
| | 8/3 | 136 |
| | 10/3 | 44 |

The data in Tables 3, 4 and 5 shows that the quaternized polyvinylamines exhibit increased efficacy at deink loop water clarification over prior art clarifiers and unquaternized polyvinylamines.

While the present invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method of clarifying deinking loop water containing dispersed inks and suspended solids in a papermill deinking process comprising adding to the deinking loop water an amount effective for clarifying the water of a combination of a quaternary polyvinylamine of the general formula:

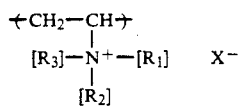

wherein $R_1$, $R_2$, and $R_3$ are independently methyl, ethyl or benzyl and wherein $X^-$ is a water soluble anion to coagulate said dispersed inks and suspended solids, and an anionic polymer flocculant selected from the group consisting of anionic acrylamide copolymer with a molecular weight ranging from about 1 million to 18 million and an anionic charged density ranging from about 5% to 60%, to flocculate the coagulated inks and solids, wherein said polyvinylamine has a molecular weight of from about 1 thousand to about 1 million, and separating the flocculated inks and solids from a clarified water.

2. The method of claim 1 wherein $X^-$ is a water soluble anion selected from the group consisting of Cl, Br, I, and $CH_3SO_4$.

3. A method of clarifying deinking loop water containing dispersed inks and suspended solids in a papermill deinking process comprising adding to the deinking loop water an amount effective for clarifying the water of a combination of a quaternary polyvinylamine of the general formula:

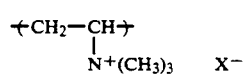

wherein $X^-$ is a water soluble anion to coagulate said dispersed inks and suspended solids, and an anionic polymer flocculant selected from the group consisting of anionic acrylamide copolymer with a molecular weight ranging from about 1 million to 18 million and an anionic charged density ranging from about 5% to 60%, to flocculate the coagulated inks and solids, wherein said polyvinylamine has a molecular weight of from about 1 thousand to about 1 million, and separating the flocculated inks and solids from a clarified water.

4. The method of claim 3 wherein $X^-$ is a water soluble anion selected from the group consisting of Cl, Br, I, and $CH_3SO_4$.

5. The method of claim 3 wherein said polyvinylamine has a molecular weight of from about 10,000 to about 500,000.